(12) United States Patent
Satti et al.

(10) Patent No.: US 11,834,042 B2
(45) Date of Patent: Dec. 5, 2023

(54) METHODS, SYSTEMS, AND APPARATUSES FOR BEHAVIORAL BASED ADAPTIVE CRUISE CONTROL (ACC) TO DRIVER'S VEHICLE OPERATION STYLE

(71) Applicant: GM GLOBAL TECHNOLOGY OPERATIONS LLC, Detroit, MI (US)

(72) Inventors: Jagannadha Reddy Satti, Walled Lake, MI (US); Amanpal S. Grewal, Novi, MI (US); Mohammadali Shahriari, Markham (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 389 days.

(21) Appl. No.: 17/148,815

(22) Filed: Jan. 14, 2021

(65) Prior Publication Data

US 2022/0219695 A1    Jul. 14, 2022

(51) Int. Cl.
*B60W 30/16* (2020.01)
*B60W 40/09* (2012.01)
*G06N 20/00* (2019.01)

(52) U.S. Cl.
CPC ............ *B60W 30/16* (2013.01); *B60W 40/09* (2013.01); *G06N 20/00* (2019.01); *B60W 2520/10* (2013.01); *B60W 2554/80* (2020.02)

(58) Field of Classification Search
None
See application file for complete search history.

(56) References Cited

U.S. PATENT DOCUMENTS

| | | | |
|---|---|---|---|
| 2019/0329773 A1* | 10/2019 | Shalev-Shwartz | G08G 1/0145 |
| 2019/0367025 A1* | 12/2019 | Pathak | B60W 40/04 |
| 2020/0086873 A1* | 3/2020 | Tahmasbi-Sarvestani | G08G 1/16 |
| 2020/0174471 A1* | 6/2020 | Du | G08G 1/0112 |
| 2022/0281451 A1* | 9/2022 | Bani Milhim | G06V 20/584 |
| 2023/0047354 A1* | 2/2023 | Wang | B60W 50/0098 |

* cited by examiner

*Primary Examiner* — Peter D Nolan
*Assistant Examiner* — Jacob Kent Besteman-Street
(74) *Attorney, Agent, or Firm* — Lorenz & Kopf LLP (57) ABSTRACT

In various embodiments, methods, systems, and vehicle apparatuses are provided. A method for implementing adaptive cruise control (ACC) established by Reinforcement Learning (RL) including executing, by a processor, adaptive cruise control to receive a set of vehicle inputs about a host vehicle's operating environment and current operations; identify, by the processor, a target vehicle operating in the host vehicle environment and quantifying a set of target vehicle parameters about the target vehicle derived from sensed inputs; modeling a state estimation of the host vehicle and the target vehicle by generating a set of speed and torque calculations about each vehicle; generating a set of results from at least one reward function based on one or more modeled state estimations of the host and target vehicle; processing the set of results with driver behavior data established by RL to correlate one or more control actions to the driver behavior data.

20 Claims, 6 Drawing Sheets

METHODS, SYSTEMS, AND APPARATUSES FOR BEHAVIORAL BASED ADAPTIVE CRUISE CONTROL (ACC) TO DRIVER'S VEHICLE OPERATION STYLE

INTRODUCTION

The present disclosure generally relates to vehicles and more particularly relates to methods, systems, and apparatuses assessing driver behavior and detecting a target vehicle behavior to train an intelligent model for adaptive cruise control functionality that correlates with a driver's style in a vehicle operation.

Recent years have seen significant advancements in autonomous and semi-autonomous driving features inland driven vehicles, such as Super Cruise (a hands-free semi-autonomous driver assistance feature that uses high-definition maps and sensors watching the road to assist with accelerating, and decelerating a vehicle), LKA (lane-keeping assist, which is a semi-autonomous driving feature that assists with the steering to keep a vehicle centered in a lane), and others. Vehicles may still be improved in a number of respects.

Adaptive Cruise Control (ACC) allows a vehicle to automatically adjust its speed to maintain a preset distance from the vehicle in front of it based on the driver's preferences. With currently available conventional cruise control systems, the driver can manually adjust the gap distance to the target vehicle in front and the speed of a host vehicle. However, in semi-autonomous driving, the distances behind a target vehicle may not suit the driver's preference. The target vehicle behavior is not currently considered when implementing acceleration and deceleration requests in adaptive cruise control (ACC).

It is desirable to understand the environment of a host vehicle operation in conjunction with a target vehicle and to modify command requests to improve ACC performance.

It is desirable to tailor an ACC to customize the target follow distance based on real-time, historic, and online driver-vehicle interactions while still maintaining appropriate safety margins.

It is desirable to classify and learn target vehicle driving behavior based on different driving scenarios (e.g. surrounding targets), road geometries, and target vehicle dynamics.

It is desirable to build a knowledge base for a host vehicle based on target vehicle interactions following performance preference-based driver behavior at least on online and historical information, driving region, target type, road class, relative lane position.

It is desirable to adjust distance following cruise controls for individuals or classes of drivers based on a real-time or stored knowledge base.

It is desirable to enable a low-cost learning and classification algorithm for driver identification executable on resource-constrained embedded controllers and to provide customer-centric lane following customization without adding additional hardware.

Furthermore, other desirable features and characteristics of the present disclosure will become apparent from the subsequent detailed description and the appended claims, taken in conjunction with the accompanying drawings and the foregoing technical field and background.

SUMMARY

In at least one exemplary embodiment, a method for implementing adaptive cruise control (ACC) using Reinforcement Learning (RL) is provided. The method includes executing, by a processor, adaptive cruise control (ACC) to receive a set of vehicle inputs about a host vehicle's operating environment and current operations; identify, by the processor, a target vehicle operating in the host vehicle environment and quantifying a set of target vehicle parameters about the target vehicle derived from sensed inputs; modeling, by the processor, a state estimation of the host vehicle and the target vehicle by generating a set of speed and torque calculations about each vehicle; generating, by the processor, a set of results from at least one reward function based on one or more modeled state estimations of the host vehicle and the target vehicle; and processing the set of results with driver behavior data contained in the RL to correlate one or more control actions to the driver behavior data.

In at least one embodiment, the method includes applying, by the processor, at least one control action that is correlated to the driver behavior data of the RL to adjust at least one operation of the adaptive cruise control of the host vehicle.

In at least one embodiment, the method includes adjusting, by the processor, the at least one control action that is correlated to the driver behavior data of the RL based on a control safety check.

In at least one embodiment, the method includes updating, by the processor, data of a learning matrix based on the generated set of results from at least one reward function to create a profile of driver behavior.

In at least one embodiment, the method includes calculating, by the processor, the reward function using a set of parameters including speed and torque calculations of estimations in acceleration and speed of the host and target vehicles.

In at least one embodiment, the method includes adjusting, by the processor, one or more distances between the host vehicle and the target vehicle based on learned driver behavior contained in the data of the learning matrix.

In at least one embodiment, the method includes the control safety check that includes a difference in speed between a safe speed and an estimation of the speed of the target and host vehicles.

In another exemplary embodiment, a system is provided. The system includes a set of inputs obtained by a processor that include a set of vehicle inputs of one or more measurement inputs of a host vehicle operation and sensed inputs of an operating environment about a host vehicle used to execute control operations of adaptive cruise control (ACC) system established by Reinforcement Learning (RL) contained in the host vehicle; the vehicle ACC system instructed by a driver behavior prediction model established by the RL that learns the driver's expectation online, and also uses a dynamic neural network (DNN) to process the set of vehicle inputs to adjust control operations based on historical data; the processor configured to identify a target vehicle operating in the host vehicle environment to quantify a set of target vehicle parameters about the target vehicle derived from sensed in the processor configured to model a state estimation of the host vehicle and the target vehicle based on a set of speed and torque calculations about each vehicle;

In at least one exemplary embodiment, the processor is configured to generate a set of results from at least one reward function based on one or more state estimations of the host and the target vehicle; and the processor configured to process the set of results with driver behavior data established by the RL to correlate one or more control actions to the driver behavior data. In a similar embodiment, historical data can be used in the DNN to correlate one or more control actions to the driver behavior data.

In at least one exemplary embodiment, the processor is configured to apply at least one control action correlated to driver behavior data established by the RL to adjust at least one control action of the ACC system of the host vehicle.

In at least one exemplary embodiment, the processor is configured to adjust at least one control action that is correlated to the driver behavior data established by the RL based on a control safety check.

In at least one exemplary embodiment, the processor is configured to adjust at least one control action that is correlated to the driver behavior data established by the RL based on a control safety check.

In at least one exemplary embodiment, the processor is configured to calculate the reward function using a set of parameters including speed and torque calculations of estimations in acceleration and speed of the host and target vehicles.

In at least one exemplary embodiment, the processor is configured to adjust one or more distances between the host vehicle and the target vehicle based on learned driver behavior contained in the data of the learning matrix.

In at least one exemplary embodiment, the processor is configured to enable the control safety check that includes a check of a difference in speed between a safe speed and an estimation of the speed of the target and host vehicles.

In yet another exemplary embodiment, a vehicle apparatus is provided. The vehicle apparatus includes a vehicle controller including a processor wherein the processor is established by a reinforcement learning (RL) and configured to: execute, by the processor, adaptive cruise control to receive a set of vehicle inputs about a host vehicle's operating environment and current operations; identify, by the processor, a target vehicle operating in the host vehicle environment and quantifying a set of target vehicle parameters about the target vehicle derived from sensed inputs; model, by the processor, a state estimation of the host vehicle and the target vehicle by generating a set of speed and torque calculations about each vehicle; generate, by the processor, a set of results from at least one reward function based on one or more modeled state estimations of the host and the target vehicle; and correlate, by the processor, the set of results with driver behavior data established by the RL to one or more control actions to the driver behavior data.

In at least one exemplary embodiment, the vehicle apparatus includes the processor which is configured to: apply at least one control action that is correlated to the driver behavior data established by the RL to adjust at least one operation of the adaptive cruise control of the host vehicle.

In at least one exemplary embodiment, the vehicle apparatus includes the processor which is configured to adjust at least one control action that is correlated to the driver behavior data established by the RL based on a control safety check.

In at least one exemplary embodiment, the vehicle apparatus includes the processor which is configured to: update data of a learning matrix based on the generated set of results from at least one reward function to create a profile of driver behavior and quantify driver's expectation.

In at least one exemplary embodiment, the vehicle apparatus includes the processor which is configured to: calculate the reward function using a set of parameters including speed and torque calculations of estimations in acceleration and speed of the host and target vehicles.

In at least one exemplary embodiment, the vehicle apparatus includes the processor which is configured to adjust one or more distances between the host vehicle and target vehicle based on learned driver behavior contained in the data of the learning matrix solve; which is learned online using the proposed RL, or in an offline fashion using the developed DNN.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The time headway to time distance to the target vehicle in an ACC system can be set in increments between 1 to 2.5 seconds. For example, if the target vehicle accelerates, the host vehicle, in turn, accelerates but to a maximum limit. If another vehicle appears in front of the target vehicle then the ACC locks onto the new target vehicle automatically with a fractional amount of time to identify the new target vehicle. While making these decisions, the ACC has no understanding of the driver preferences in different geographies, settings, etc. . . . . The ACC may monitor the vehicle's movement, and collect data for driver preferences.

The present disclosure provides methods, systems, and apparatuses that enable an intelligent system and method that mathematically quantifies the target vehicle behavior and incorporates its behavior into an adaptive control design that provides what is desired to the adaptive cruise control feature.

Further, the present disclosure provides methods, systems, and apparatuses that enable an online approach that is a smart feature that is an add on to improve the performance and desirable following distance in an interactive manner.

Further, provides methods, systems, and apparatuses that enable classifying the attributes of target vehicles and locations to adaptive cruise control.

Figure 1:
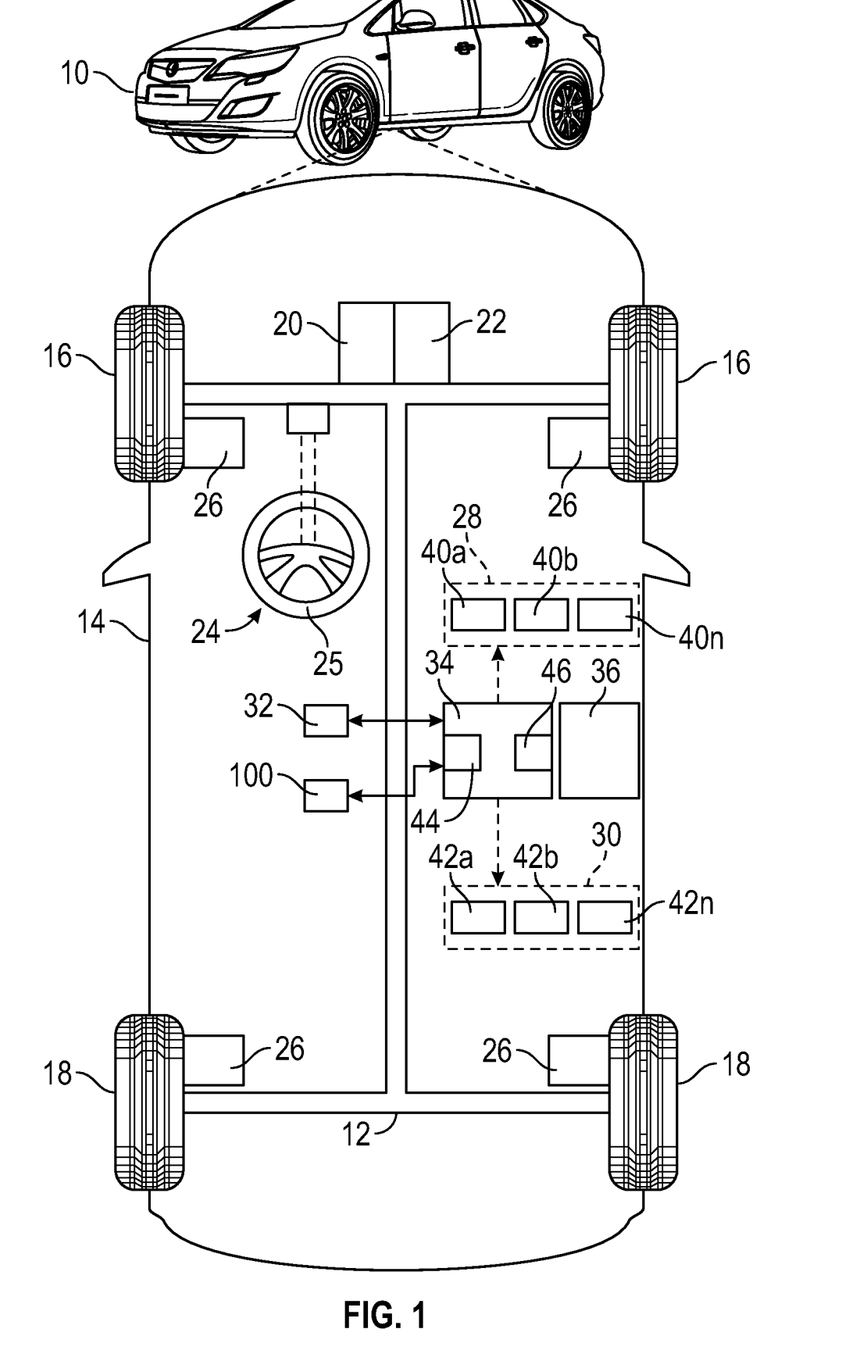
FIG. 1 is a functional block diagram illustrating an autonomous or semi-autonomous vehicle having a control system that controls vehicle actions based on using a neural network to driver behavior in a vehicle control system, in accordance with exemplary embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) established by Reinforcement Learning (RL) which is or can be stored in a DNN type model that controls operation in response to data from vehicle inputs, for example, as described in greater detail further below in connection with FIGS. 2-6.

In various exemplary embodiments, the system 100 is enabled to provide an ACC behavior prediction model that learns the driver's preference for following a distance from different target vehicles. The system 100 includes a methodology to classify driver's preference based on driving scenarios (e.g., traffic signs, stop and go traffic, city driving, etc.). The system 100 is enabled to build a knowledge base for a target following performance preference by utilizing online and historical driver and environmental information. The system 100 is enabled to use online driver-vehicle interactions to adjust the lane following the performance and to enable based on a real-time or stored knowledge adjusting of lane following controls for individual or classes of drivers. The system 100 can also adjust the lane following performance preference on a vehicle based on driver ID and can provide a low-cost learning method with a classification algorithm for driver identification executable on resource-constrained ECUs (deployable on top of the existing Super-Cruise/LC lateral controls algorithm). The system 100 provides lane following customization while maintaining safety margins.

In various exemplary embodiments, system 100 provides a process using an algorithm that controls torque and speed in a host vehicle's 10 embedded controller software of the system 100 allowing DNNs to be used for an ACC behavior prediction model. The system 100 enables learning of driver's preference for following distance for different target vehicles such a target vehicle and to classify driver's preference based on driving scenarios; e.g., traffic signs, stop and go traffic, city driving, etc. The system 100 using a Q-matrix can build a knowledge base for target vehicles following performance preference by utilizing online and historical driver and environmental information.

As depicted in FIG. 1, vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, vehicle 10 is autonomous or semi-autonomous, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network 33) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84, 34 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally also includes a propulsion system 20, a transmission system 22, a brake system 26, one or more user input devices 27, a sensor system 28, an actuator system 30, at least one data storage device 32, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes a vehicle controller that will be directly affected based on the neural networks 33 model's output. In an exemplary embodiment, a feed-forward operation can be applied for an adjustment factor that is the continuous output of the neural network 33 models to generate a control action for the desired torque or other like action (in case of a continuous neural network 33 models, for example, the continuous APC/SPARK prediction values are outputs).

In various embodiments, one or more user input devices 27 receive inputs from one or more passengers (and driver 11) of the vehicle 10. In various embodiments, the inputs include a desired destination of travel for the vehicle 10. In certain embodiments, one or more input devices 27 include an interactive touch-screen in the vehicle 10. In certain embodiments, one or more input devices 27 include a speaker for receiving audio information from the passengers. In certain other embodiments, one or more input devices 27 may include one or more other types of devices and/or maybe coupled to a user device (e.g., smartphone and/or other electronic devices) of the passengers.

The sensor system 28 includes one or more sensors 40*a*-40*n* that sense observable conditions of the exterior environment and/or the interior environment of the vehicle 10. The sensors 40*a*-40*n* include but are not limited to, radars, lidars, global positioning systems, optical cameras, thermal cameras, ultrasonic sensors, inertial measurement units, and/or other sensors.

The actuator system 30 includes one or more actuators 42*a*-42*n* that control one or more vehicle features such as, but not limited to, canister purge system 31, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

Figure 2:
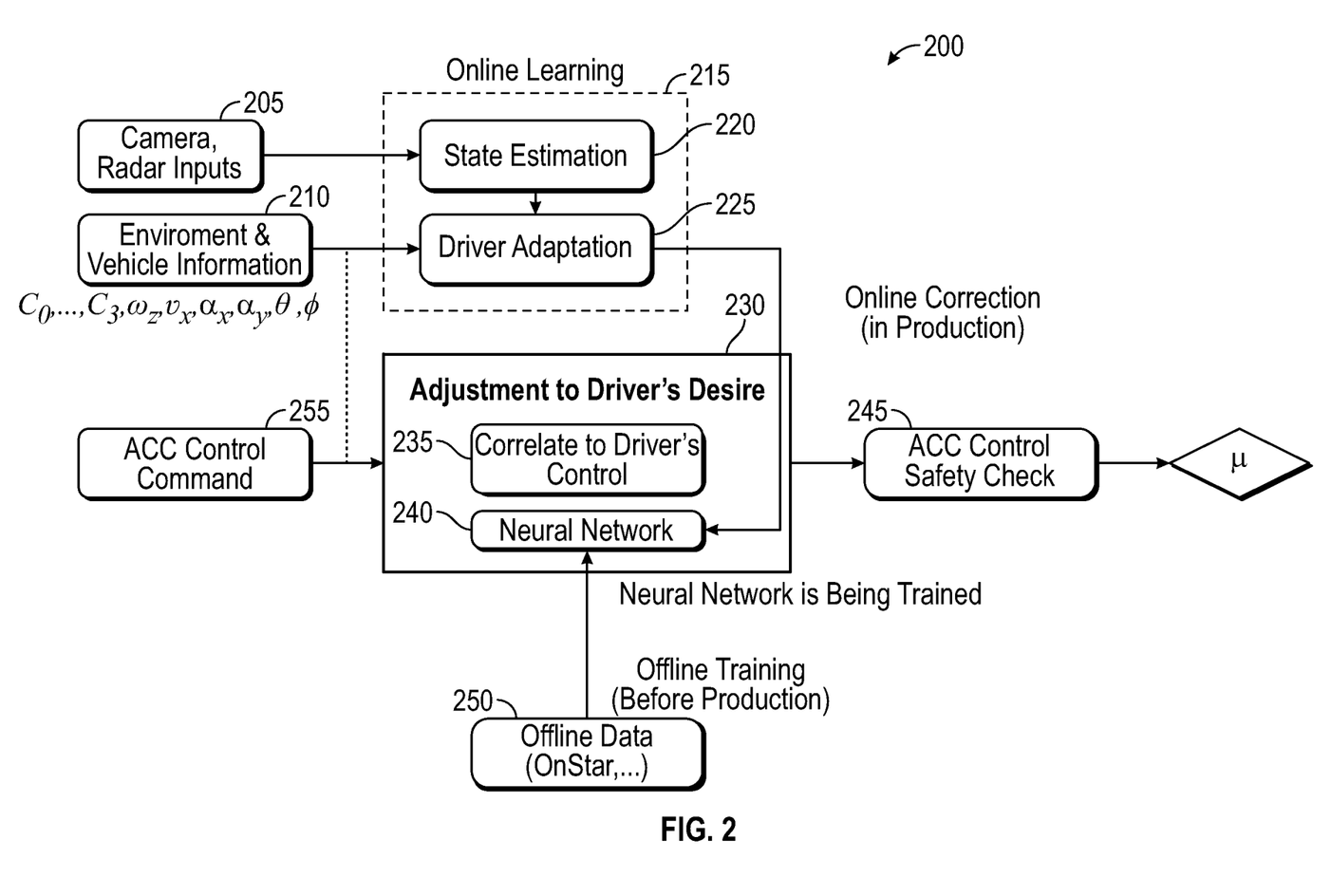
FIG. 2 is a diagram illustrating an adaptive cruise control system which can be implemented using the neural network to predict driver behavior of a vehicle control system, in accordance with various embodiments.

The data storage device 32 stores data for use in automatically controlling the vehicle 10, including the storing of data of a DNN that is established by the RL, used to predict a driver behavior for the vehicle control. In various embodiments, the data storage device 32 stores a machine learning model of a DNN and other data models established by the RL. The model established by the RL can take place for a DNN behavior prediction model or RL established model (See. FIG. 2, DNN prediction model (210) or RL prediction model). In an exemplary embodiment, no separate training is required for the DNN rather, the DNN behavior prediction model (i.e., DNN prediction model) is implemented with a set of learned functions. In various embodiments, the neural network 33 (i.e., DNN behavior prediction model) may be established by RL or trained by a supervised learning methodology by a remote system and communicated or provisioned in vehicle 10 (wirelessly and/or in a wired manner) and stored in the data storage device 32. The DNN behavior prediction model can also be trained via supervised or unsupervised learning based on input vehicle data of a host vehicle operations and/or sensed data about a host vehicles operating environment.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of controller 34, separate from controller 34, or part of controller 34 and part of a separate system.

Controller 34 implements the logic model established by RL or for the DNN based on the DNN behavior model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

With reference now to FIG. 2, FIG. 2 is a diagram illustrating an adaptive cruise control (ACC) system 200 which can be implemented using the dynamic neural network to predict driver behavior of a vehicle control system, in accordance with various embodiments. The system 200 includes set inputs of vehicle sensors 205 (as described in FIG. 1), that include for example inputs from radar, camera, lidar, etc. as well as inputs 210 from the environment (surroundings of the vehicle) and vehicle instrumental data. The inputs 210 are received by state estimation module 220 that makes up an online learning module 215. The inputs 210 are received by a driver adaptation module 225 that make up the online learning module 215. The online learning module 215 generates an online correction to the adjustment driver's desire module 230. The ACC control command 255 is received by the adjustment driver's desire module 230. The adjustment driver's desire module 230 correlates to the driver control by correlating to the driver's control module 235 and stores the correlation information and new setting in the neural network 240. The adjustment driver's desire module 230 implements a safety check via the ACC control safety check 245.

In an exemplary embodiment, the ACC control safety check is implemented for an online adaptation. The quantification function of the safety check is defined as follows: $V_{safety}=d^{-2}+(v_{ACC}-v_{est})^2$. The is $V_{safety}=0$ when only $v_{ACC}=v_{est}$ and $d\rightarrow\infty$; otherwise $V_{safety}>0$. The desire is to improve ACC control and to have $V_{safety}\rightarrow 0$. In other cases $V_{safety}>>0$ which is an indication that the control that is implemented requires adjustment or is malfunctioning.

To calculate $V_{safety}$ without making the host vehicle's ACC control unstable or degrade the performance the same or a similar ACC torque can be applied to a vehicle dynamics model and calculate a $v_{Aprx}=f(\tau_{Acc}, v_{est}, \ldots)$. The vehicle dynamics can then be checked for a model based on speed safety measurement as follows: $V_{safety, Aprx}=(d+\Delta(v_{Aprx}))^{-2}+(v_{ACC}-v_{est})^2$. Therefore, the safety can be checked if the following is true, which indicates that the ACC adaptive control method's command is deemed safe and can be improved (the safety check may also indicate that $V_{safety,Aprx}$ is non-increasing)

$$\frac{d}{dt}V_{safety,Aprx}\leq 0.$$

In the safety check, the goal is generally to improve ACC control and to have $V_{safety}\rightarrow 0$. The offline data is also sent via the offline data module 250 to the adjustment driver's desire module 230.

Figure 3:
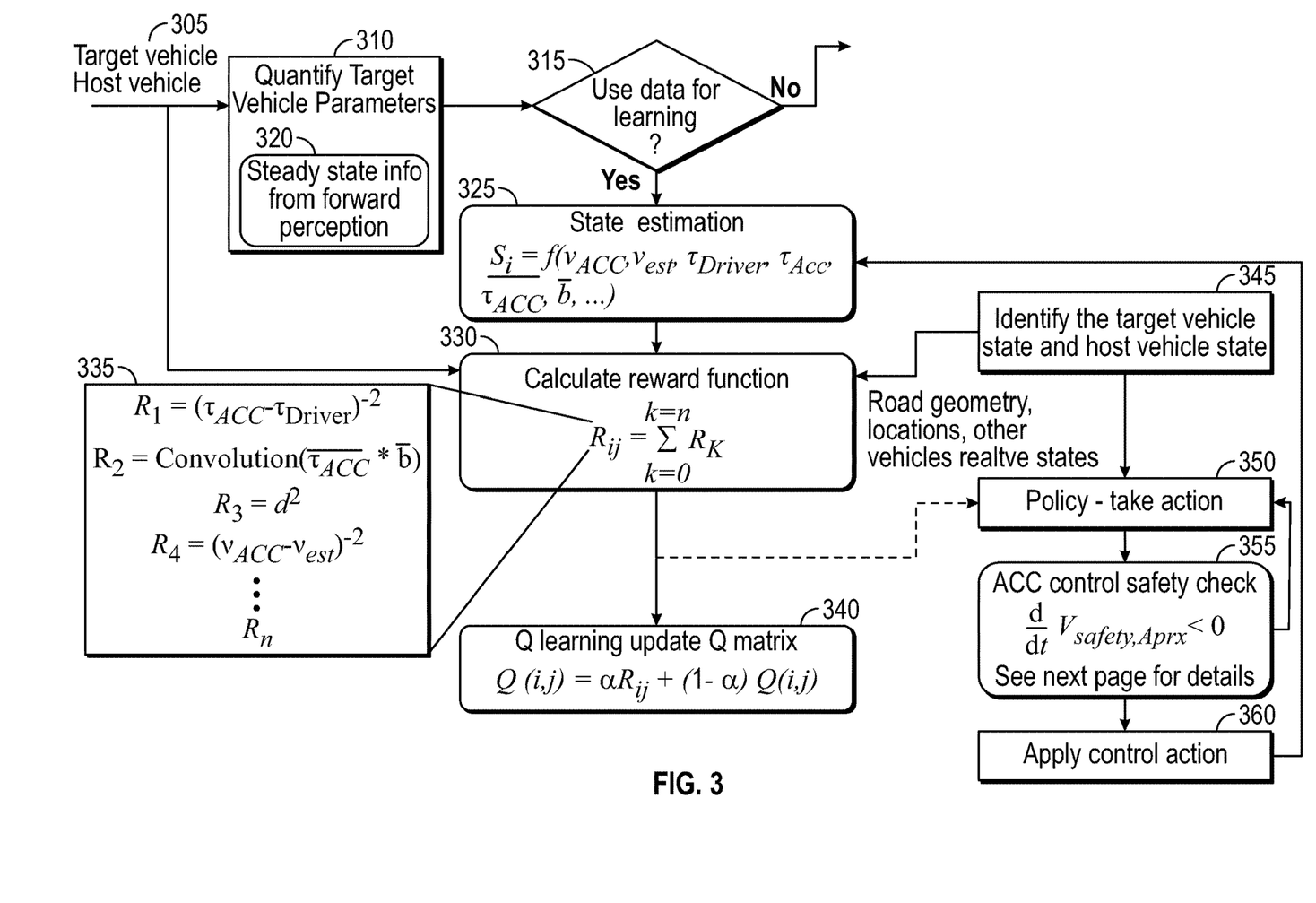
FIG. 3 is a diagram illustrating components of an adaptive cruise control system which can be implemented using the neural network to predict driver behavior of a vehicle control system, in accordance with various embodiments illustrated in FIGS. 1-2, in accordance with various embodiments.

FIG. 3 is a diagram illustrating components of an adaptive cruise control system which can be implemented using the neural network to predict driver behavior of a vehicle control system, in accordance with various embodiments illustrated in FIGS. 1-2, in accordance with various embodiments. In FIG. 3, the target vehicle and host information vehicle dynamic operating parameter information is received and quantified at quantifying module 310 that includes steps to quantify target vehicle parameters and generate steady-state information about the target vehicle from forward perception collected information and analysis.

The quantified information and steady-state information is analyzed by a data learning module 305 to quantify to be sent to the state estimation module 325. The state estimation module 325 implements the function $s_i=f(v_{ACC}, v_{est}, \tau_{Driver}, \tau_{ACC}, \overline{\tau_{Acc}}, \overline{b}, \ldots)$ to determine the states of the target and the host vehicle. The state estimation is based on the parameters of the speed determined by the $v_{Acc}$, speed estimated $v_{est}$, the driver torque $\tau_{Driver}$, and the ACC torque $\Delta_{ACC}$, and the time vector of the ACC torque $\overline{\tau_{Acc}}$, and time vector of the target vehicle's brake light detected ($\overline{b}$), and other parameters. In addition, the Reward function $R_{ij}$ between control of the host vehicle to the target vehicle $R_{ij}=\tau_{k=0}^{k=n}R_k$. In calculating the reward function $R_{ij}$, the target vehicle and host vehicle states are identified and received via input 345.

In an exemplary embodiment for a set of reward functions R to determine the reward function ($R_1$ to $R_4$) is represented as follows: $R_1=(\tau_{ACC}-\tau_{Driver})^{-2}$, $R_2=\text{Convolution}(\overline{\tau_{Acc}}*\overline{b})$, $R_3=d^2$, and $R_4=(V_{ACC}-v_{est})^{-2}$ to $R_n$.

This estimation model allows the ACC learning reward's function to best correlate to the driver's style of vehicle operation, driver profile. A driver profile can be learned and saved for each 'Driver ID'.

The Q learning module 340 can update Q matrix $Q(i,j)=\alpha R_{ij}+(1-\alpha)Q(i,j)$ after the policy action 350 is checked. The ACC control safety check 355 checks the speed of the host vehicle $$\frac{d}{dt}V_{safety,}$$

$_{Aprx}\leq 0$. The appropriate control action 360 can then be applied after the safety check.

Figure 4:
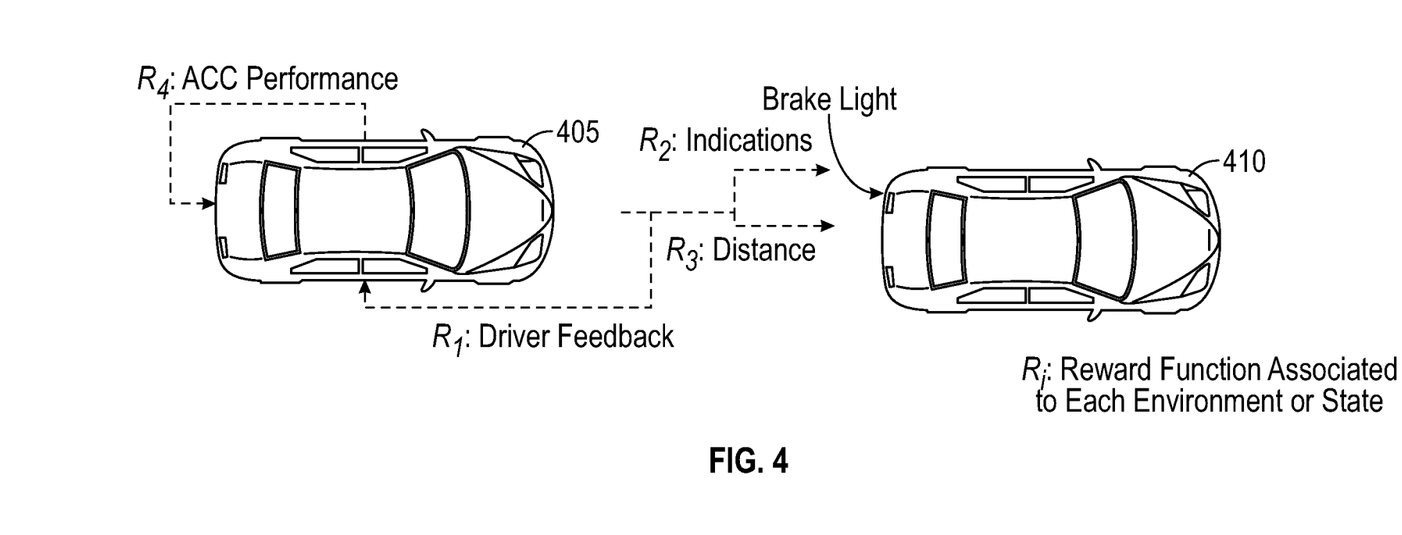
FIG. 4 illustrates an exemplary diagram of reward functions for use in the control method of the adaptive cruise control system illustrated in FIGS. 1-3, in accordance with various embodiments.

FIG. 4 illustrates an exemplary diagram of reward functions for use in the control method of the adaptive cruise control system illustrated in FIGS. 1-3, in accordance with various embodiments. In FIG. 4 the exemplary diagram includes a host vehicle 405 and a target vehicle 410 with a set of reward functions that are calculated of $R_1$ driver feedback, $R_2$ indication, $R_3$ distance, and $R_4$ ACC performance where the $R_i$ is a reward function associated with each environment or state.

Figure 5:
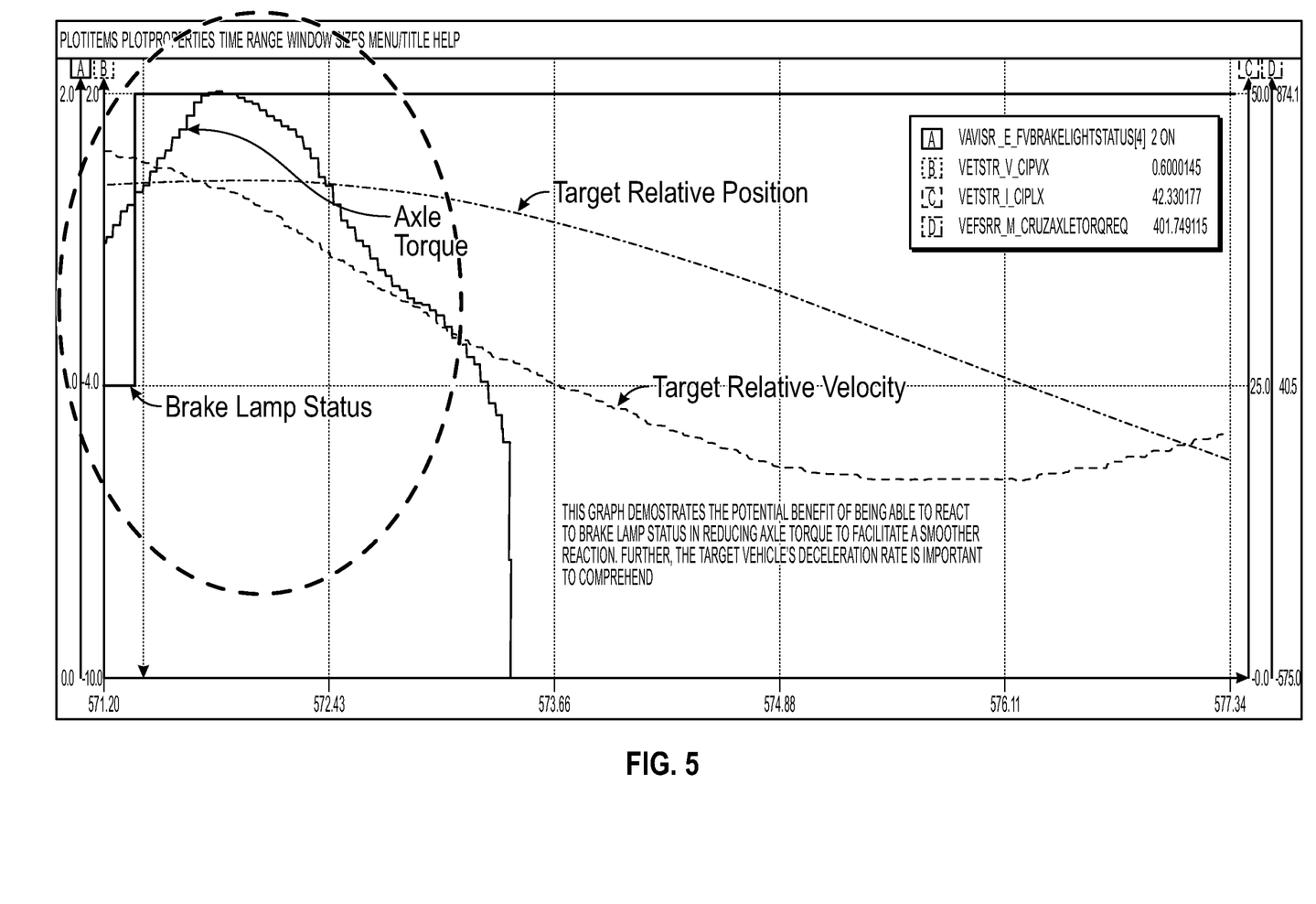
FIG. 5. is an exemplary graph that illustrates the potential benefit of an example use of the adaptive cruise control system illustrated in FIGS. 1-3, in accordance with various embodiments.

FIG. 5. is an exemplary graph that illustrates the potential benefit of an example use of the adaptive cruise control system illustrated in FIGS. 1-3, in accordance with various embodiments. The graph of FIG. 5 demonstrates an exemplary embodiment of a host vehicle's potential benefit with the adaptive ACC system initiated to react to a brake lamp status in a target vehicle in reducing axle torque of the host vehicle that results in or facilitates a smoother reaction of the brake light. The target vehicle's deceleration rate is corresponding more flat.

Figure 6:
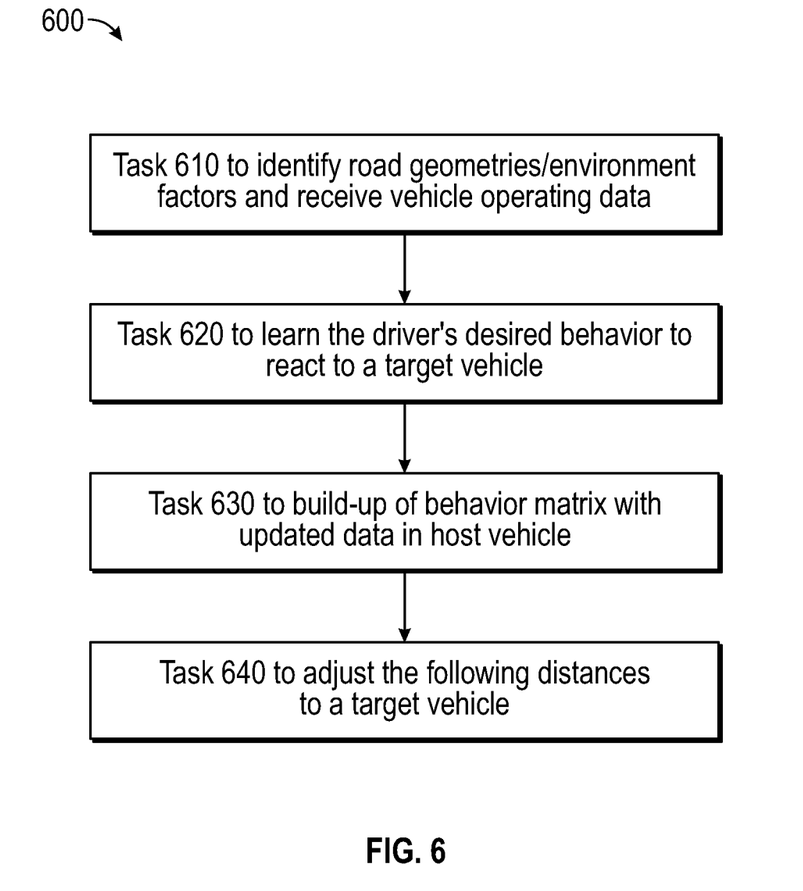
FIG. 6 is an exemplary flowchart that illustrates the steps for use in the adaptive cruise control system illustrated in FIGS. 1-3, in accordance with various embodiments.

FIG. 6 is an exemplary flowchart that illustrates the steps for use in the adaptive cruise control system illustrated in FIGS. 1-3, in accordance with various embodiments.

In FIG. 6, the flowchart 600 in task 610 to identify road geometries and environment factors by executing the adaptive cruise control to receive a set of vehicle inputs about a host vehicle's operating environment and current operations. Next in task 620, to learn the driver's desired behavior to react to various states of the target vehicle by identifying a target vehicle operating in the host vehicle environment and quantifying a set of target vehicle parameters about the target vehicle derived from sensed inputs. In addition, by modeling a state estimation of the host vehicle and the target vehicle by generating a set of speed and torque calculations about each vehicle and generating a set of results from at least one reward function based on one or more modeled state estimations of the host and the target vehicle. Then processing the set of results with driver behavior data contained in the DNN to correlate one or more control actions to the driver behavior data.

In an exemplary embodiment, the following distance is quantified for a target vehicle for modeling drivers driving patterns in the host vehicle. At task 630, the desired build-up of behavior matrix with updated data based on generated sets of results from the reward function to create a profile of driver behavior. At task 640, the ACC system is implemented to adjust the following distances by providing a desired acceleration and deceleration rate. The ACC system performs the required control actions for the host vehicle operations by calculations of the reward function using a set of the parameter for speed and torque calculations and estimations in acceleration and speed of the host and target vehicles.

In various exemplary embodiments, the driver behavior prediction model logic that is implemented can be created in offline training derived from supervised or unsupervised learning processes and can be enabled using other neural networks. For example, the other neural networks may include trained convolutional neural network (CNN) and/or recurrent neural network (RNN) in which a similar methodology can be applied and used in vehicle control operations. In addition, alternate embodiments can be considered that includes a neural network composed of multiple layers (i.e., 3 layers) of convolutional neural network (CNN) and also with dense layers (i.e., 2 dense layers) that have been trained offline and enable control of operations of the ACC in coordination with the system illustrated in FIG. 1, in accordance with various embodiments.

The dynamic neural network is used to inform the ACC controller of torque and speed characteristics and is configured as an already trained neural network. Hence, in certain embodiments, the process of the torque prediction system is configured in an operational mode only. For example, in various embodiments, the dynamic neural network is trained during a training mode prior to use or provisioned in the vehicle (or other vehicles). Once the dynamic neural network is trained, it may be implemented in a vehicle (e.g., the vehicle 10 of FIG. 1) in an operational mode, in which the vehicle is operated in an autonomous, semi-autonomous or manual manner.

In various alternative exemplary embodiments, it will be appreciated that the neural network may also be implemented in both the training mode and the operational mode in a vehicle and trained during an initial operation period in conjunction with operations of a time delay or like methodology for torque control predictions. Also, a vehicle may operate solely in the operating mode with neural networks that have already been trained via a training mode of the same vehicle and/or other vehicles in various embodiments.

As mentioned briefly, the various modules and systems described above may be implemented as one or more machine learning models that undergo supervised, unsupervised, semi-supervised, or reinforcement learning. Such models might be trained to perform classification (e.g., binary or multiclass classification), regression, clustering, dimensionality reduction, and/or such tasks. Examples of such models include, without limitation, artificial neural networks (ANN) (such as a recurrent neural network (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation-maximization, hierarchical clustering, etc.), and linear discriminant analysis models.

It should be appreciated that process of FIGS. 1-6 may include any number of additional or alternative tasks, the tasks shown in FIGS. 1-6 need not be performed in the illustrated order and process of the FIGS. 1-6 may be incorporated into a more comprehensive procedure or process having additional functionality not described in detail herein. Moreover, one or more of the tasks shown in FIGS. 1-6 could be omitted from an embodiment of the process shown in FIGS. 1-6 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for implementing adaptive cruise control (ACC) established by Reinforcement Learning (RL) comprising:
   executing, by a processor, adaptive cruise control to receive a set of vehicle inputs about a host vehicle's operating environment and current operations;
   identifying, by the processor, a target vehicle operating in the host vehicle environment and quantifying a set of target vehicle parameters about the target vehicle derived from sensed inputs;
   modeling, by the processor, a state estimation of the host vehicle and the target vehicle by generating a set of speed and torque calculations about each vehicle, and by utilizing a first time vector of ACC torque and a second time vector of detection of a brake light of the target vehicle;
   generating, by the processor, a set of results from at least one reward function based on one or more modeled state estimations of the host vehicle and the target vehicle; and
   processing the set of results with driver behavior data established by the RL to correlate one or more control actions to the driver behavior data;
   wherein the generating of the set of results is performed from a plurality of reward functions comprising:
   a first reward function $R_1$ pertaining to driver feedback and based on a difference between a driver torque ($\tau_{Driver}$) and an ACC torque ($\tau_{ACC}$);
   a second reward function $R_2$ pertaining to an indication and based on the first time vector of ACC torque ($\overline{\tau_{Acc}}$) and the second time vector of detection of the brake light of the target vehicle ($\overline{b}$);
   a third reward function $R_3$ pertaining to distance and based on a distance (d) between the host vehicle and the target vehicle; and
   a fourth reward function $R_4$ pertaining ACC performance and based on an ACC speed (($v_{ACC}$) and an estimated speed ($v_{est}$).

2. The method of claim 1, further comprising:
   applying, by the processor, at least one control action that is correlated to the driver behavior data established by RL to adjust at least one operation of the adaptive cruise control of the host vehicle.

3. The method of claim 2, further comprising:
   adjusting, by the processor, the at least one control action that is correlated to the driver behavior data established by RL based on a control safety check.

4. The method of claim 3, further comprising:
updating, by the processor, data of a learning matrix based on the generated set of results from the at least one reward function to create a profile of driver behavior.

5. The method of claim 4, further comprising:
calculating, by the processor, the reward function using a set of parameters comprising speed and torque calculations of estimations in acceleration and speed of the host and target vehicles.

6. The method of claim 5, further comprising:
adjusting, by the processor, one or more distances between the host vehicle and the target vehicle based on learned driver behavior contained in the data of the learning matrix.

7. The method of claim 6, wherein the control safety check comprises a difference in speed between a safe speed and an estimation of the speed of the target and host vehicles.

8. The method of claim 1, wherein the modeling of the state estimation is further performed based on an identification of road geometries.

9. The method of claim 1, wherein:
the first reward function R1 is calculated in accordance with the following equation $R1=(\tau_{ACC}-\tau_{Driver})^{-2}$;
the second reward function R2 is calculated in accordance with the following equation $R_2=\text{Convolution}(\overline{\tau_{Acc}}*\overline{b})$;
the third reward function R3 is calculated in accordance with the following equation $R_3=d^2$; and
the fourth reward function R4 is calculated in accordance with the following equation $R_4=(v_{ACC}-v_{est})^{-2}$.

10. A system comprising:
a set of inputs obtained by a processor that comprise a set of vehicle inputs of one or more measurement inputs of a host vehicle operation and sensed inputs of an operating environment about a host vehicle used to execute control operations of a vehicle adaptive cruise control (ACC) system established by Reinforcement Learning (RL) and contained in the host vehicle;
the vehicle ACC system instructed by a driver behavior prediction model implemented by the processor established by RL that learns the driver's expectation online, and uses a neural network (NN) to process the set of vehicle inputs to adjust control operations;
the processor configured to identify a target vehicle operating in the host vehicle environment to quantify a set of target vehicle parameters about the target vehicle derived from sensed inputs;
the processor configured to model a state estimation of the host vehicle and the target vehicle based on a set of speed and torque calculations about each vehicle, and by utilizing a first time vector of ACC torque and a second time vector of detection of a brake light of the target vehicle;
the processor configured to generate a set of results from at least one reward function based on one or more state estimations of the host and the target vehicle;
the processor configured to process the set of results with driver behavior data established by RL to correlate one or more control actions to the driver behavior data; and
wherein the process is further configured to generate the set of results from a plurality of reward functions comprising:
a first reward function $R_1$ pertaining to driver feedback and based on a difference between a driver torque ($\tau_{Driver}$) and an ACC torque ($\tau_{ACC}$);
a second reward function $R_2$ pertaining to an indication and based on the first time vector of ACC torque ($\overline{\tau_{Acc}}$) and the second time vector of detection of the brake light of the target vehicle ($\overline{b}$);
a third reward function $R_3$ pertaining to distance and based on a distance (d) between the host vehicle and the target vehicle; and
a fourth reward function $R_4$ pertaining ACC performance and based on an ACC speed (($v_{ACC}$) and an estimated speed ($v_{est}$).

11. The system of claim 10, further comprising the processor configured to:
apply at least one control action correlated to the driver behavior data established by RL to adjust at least one control action of the ACC system of the host vehicle;
adjust the at least one control action that is correlated to the driver behavior data established by RL based on a control safety check;
adjust the at least one control action that is correlated to the driver behavior data of the NN based on a control safety check; and,
calculate the reward function using a set of parameters comprising speed and torque calculations of estimations in acceleration and speed of the host and target vehicles.

12. The system of claim 11, further comprising:
the processor configured to adjust one or more distances between the host vehicle and the target vehicle based on learned driver behavior contained in the data of a learning matrix based on the generated set of results from the at least one reward function to create a profile of driver behavior.

13. The system of claim 12, wherein the control safety check comprises a difference in speed between a safe speed and an estimation of the speed of the target and host vehicles.

14. A vehicle apparatus comprising:
a vehicle controller comprising a processor wherein the processor is coupled to a dynamic neural network (DNN) adapted with a Reinforcement Learning (RL) based on driver's feedback and configured to:
execute, by the processor, adaptive cruise control to receive a set of vehicle inputs about a host vehicle's operating environment and current operations;
identify, by the processor, a target vehicle operating in the host vehicle environment and quantifying a set of target vehicle parameters about the target vehicle derived from sensed inputs;
model, by the processor, a state estimation of the host vehicle and the target vehicle by generating a set of speed and torque calculations about each vehicle, and by utilizing a first time vector of ACC torque and a second time vector of detection of a brake light of the target vehicle;
generate, by the processor, a set of results from at least one reward function based on one or more modeled state estimations of the host and the target vehicle; and
correlate, by the processor, the set of results with driver behavior data adapted by RL to one or more control actions to the driver behavior data;
wherein the generating of the set of results is performed from a plurality of reward functions comprising:
a first reward function $R_1$ pertaining to driver feedback and based on a difference between a driver torque ($\tau_{Driver}$) and an ACC torque ($\tau_{ACC}$);
a second reward function $R_2$ pertaining to an indication and based on the first time vector of ACC torque ($\overline{\tau_{Acc}}$) and the second time vector of detection of the brake light of the target vehicle ($\overline{b}$);

a third reward function $R_3$ pertaining to distance and based on a distance (d) between the host vehicle and the target vehicle; and a fourth reward function $R_4$ pertaining ACC performance and based on an ACC speed (($v_{ACC}$) and an estimated speed ($v_{est}$).

15. The vehicle apparatus of claim 14, further comprising: the processor configured to:

apply at least one control action that is correlated to the driver behavior data adapted by RL to adjust at least one operation of the adaptive cruise control of the host vehicle.

16. The vehicle apparatus of claim 15, further comprising: the processor configured to:

adjust the at least one control action that is correlated to the driver behavior data adapted by RL based on a control safety check.

17. The vehicle apparatus of claim 16, further comprising: the processor configured to:

update data of a learning matrix based on the generated set of results from the at least one reward function to create a profile of driver behavior.

18. The vehicle apparatus of claim 17, further comprising: the processor configured to:

calculate the reward function using a set of parameters comprising speed and torque calculations of estimations in acceleration and speed of the host and target vehicles.

19. The vehicle apparatus of claim 18, further comprising: the processor configured to:

adjust one or more distances between the host vehicle and target vehicle based on learned driver behavior contained in the data of the learning matrix.

20. The vehicle apparatus of claim 14, wherein:

the first reward function R1 is calculated in accordance with the following equation $R_1=(\tau_{ACC}-\tau_{Driver})^{-2}$;

the second reward function R2 is calculated in accordance with the following equation $R_2=\text{Convolution}(\overline{\tau_{Acc}}*\overline{b})$;

the third reward function R3 is calculated in accordance with the following equation $R_3=d^2$; and the fourth reward function R4 is calculated in accordance with the following equation $R_4=(v_{ACC}-v_{est})^{-2}$.

\* \* \* \* \*